(12) United States Patent (10) Patent No.: US 7,222,916 B2
De Wilde et al. (45) Date of Patent: May 29, 2007

(54) ENERGY ABSORBING DEVICE AND SHOULDER BELT-TYPE VEHICLE SEATS COMPRISING SUCH ENERGY ABSORBING DEVICE

(75) Inventors: Roland De Wilde, Kraainem (BE); Francois Braun, Kraainem (BE)

(73) Assignee: JTR Engineering S.A., Brussels (BE)

( * ) Notice: Subject to any disclaimer, the term of this patent is extended or adjusted under 35 U.S.C. 154(b) by 258 days.

(21) Appl. No.: 10/527,450

(22) PCT Filed: Sep. 4, 2003

(86) PCT No.: PCT/BE03/00148

§ 371 (c)(1),
(2), (4) Date: Mar. 11, 2005

(87) PCT Pub. No.: WO2004/024560

PCT Pub. Date: Mar. 25, 2004

(65) Prior Publication Data

US 2006/0103191 A1 May 18, 2006

(30) Foreign Application Priority Data

Sep. 11, 2002 (EP) .................................. 02078748

(51) Int. Cl.
*B60N 2/427* (2006.01)
(52) U.S. Cl. ............... 297/216.14; 297/216.1; 297/216.13; 297/367
(58) Field of Classification Search ............ 297/216.1, 297/216.13, 216.14, 367
See application file for complete search history.

(56) References Cited

U.S. PATENT DOCUMENTS 4,145,081 A * 3/1979 Withers ................. 297/216.14

(Continued)

FOREIGN PATENT DOCUMENTS

EP  1000822 A2  5/2000

(Continued)

*Primary Examiner*—Peter R. Brown
(74) *Attorney, Agent, or Firm*—Browdy and Neimark, PLLC

(57) ABSTRACT

The invention relates to a vehicle seat for equipment with shoulder belts (24) connected to the seat backrest (21), comprising an energy absorbing device (1) acting on the seat backrest, wherein said energy absorbing device comprises deformable energy absorbing means (12), with at least one arcuate (13, 14) area of plastically fragmentable material, opposing the rotation of said seat backrest (21) with respect to a lower seat structure (20) in a first direction, corresponding to a forward-leaning movement of said seat backrest. The invention also relates to energy absorbing devices opposing the rotation of a first part (1) with respect to a second part (2) via deformable energy absorbing means (12) with an arcuate area (13, 14) of plastically fragmentable material, wherein the energy absorbing device comprises releasable retention means (16) subjecting every rotation of said first part with respect to said second part into a first direction to the reaction of said energy absorbing means and allowing the rotation of said first part with respect to said second part, into the direction opposite to said first direction, without acting on said energy absorbing means.

15 Claims, 8 Drawing Sheets

U.S. PATENT DOCUMENTS 4,688,662 A * 8/1987 Correll .................... 297/216.1
5,636,806 A   6/1997 Sayles
5,664,807 A   9/1997 Bohmler
5,676,421 A * 10/1997 Brodsky ................ 297/216.13
5,697,478 A * 12/1997 Di Stefano .............. 297/216.1
5,938,265 A * 8/1999 Oyabu et al. .............. 296/68.1
6,053,571 A * 4/2000 Faigle ................... 297/216.13
6,164,720 A * 12/2000 Haglund .................. 297/216.1
6,474,734 B1 * 11/2002 Masuda et al. ........ 297/216.13
6,779,841 B2 * 8/2004 Eckendorff ............ 297/216.13

FOREIGN PATENT DOCUMENTS

FR          2744961         8/1997

* cited by examiner

ENERGY ABSORBING DEVICE AND SHOULDER BELT-TYPE VEHICLE SEATS COMPRISING SUCH ENERGY ABSORBING DEVICE

BACKGROUND OF THE INVENTION

The invention relates to a mechanical device designed to dissipate kinetic energy, such as (part of) the kinetic energy of a vehicle seat (in particular an aircraft passenger seat) and its occupant, when involved in a survivable accident or incident (such as an emergency landing of an aircraft).

More particularly the invention relates to such a device which can be used in connection with vehicle seats provided with shoulder belts.

The expression "vehicle seat" as used in the present text refers to seats that are appropriate for road or other surface transport vehicles and for air transport vehicles; the vehicle seats to which the invention most suitably applies are seats for public transport vehicles and aircrafts.

Several energy absorbing systems for transport category aircraft seats have been proposed in the art.

Most of the know systems are however designed to absorb the energy in the underframe structure of the seat. Reference can for instance be made in this respect to the following patent publications: DE 440 57 53, GB 2243540, U.S. Pat. No. 5,699,984, U.S. Pat. No. 5,069,505, U.S. Pat. No. 4,861,103.

These known systems present serious drawbacks in view of the new standards for seats in transport category aircrafts issued in June 1998 by the U.S. Federal Aviation Administration (FAA) and the European Joint Aviation Authorities (JAA), to improve the chances of passenger survival in emergency landing. Essentially the new rules are contained in the FAR/JAR 25-561/562. Of utmost importance to the background of this Patent, is the section prescribing:

1. In § A and § B, the emergency landing conditions governing the design of the seat and restraint system supposed to protect the passengers.
2. In § C, a set of performance pass/fail criteria, related to the human body tolerance to impact loads, that must not be exceeded during the dynamic tests conducted in accordance with § A and § B of this section, in particular the Head Injury Criteria (HIC).

The above set of criteria for seats design is well known by the air transport industry and aircrafts & seats manufacturers since June 1986. It appears however that the new performance standards prescribed in § C didn't receive appropriate attention.

Most of the redesign effort was focused on the seat structure to comply with the § A and § B, leaving the protection of the occupants to a patchwork of partial measures for most of the requirements of § C, resulting in no solution regarding the HIC, with however the exception of an inflatable lap belt system, derived from the air-bag technology, associated to a conventional seat structure.

According to the new rules, the former impact load required to be sustained by the seat structure, and its tie-down to the floor, was raised from a 9 g static load to a dynamic impact pulse triangularly shaped, peaking at 16 g. To meet that condition, most seat manufacturers developed various means to absorb part of the kinetic energy involved, in order to smooth off the peak of the 16 g pulse at a level acceptable by both the structure of the seat and its tie-down to the floor.

This process has however its limitations:

Because the space available between seat rows is limited, to protect the egress path of the passengers in emergency conditions, the maximum stroke allowed to the seat structure by any type of energy absorption device is limited to 3 inches by the airworthiness authorities.

While this stroke might provide some smoothing off the peak dynamic pulse, it has practically no effect on the occupant excursion. Instead he will be allowed to pick-up speed relatively to the seat or the bulkhead in front, resulting in a secondary impact of the head which can be lethal.

In view of this, one approach to meet the new requirements will probably involve the use of shoulder belt type passenger seats in transport category aircrafts.

Only few energy absorption systems have been proposed which can affect the backrest of the seat and can therefore be used on such shoulder belt type passenger seats.

Thus, for instance, U.S. Pat. No. 6,209,955, involving a deformable back seat structure, U.S. Pat. No. 5,676,421 proposing multiple fragmentation pins on the back seat, U.S. Pat. No. 5,320,308 proposing a structural "breakover" device in association with a friction brake or clutch arrangement on the seat back, or EP 0 651 957 proposing a back seat structure with damping structural parts.

DE 19648974 proposes a rather complex energy absorption device, involving torsion bars and breakable connecting pieces, to be used on the underframe seat structure as well as at different levels of the back seat structure.

U.S. Pat. No. 4,688,662 on the other hand describes an energy absorber system on the interconnection of the seat bottom frame and the seat back frame The system utilises a pair of housings having facing cavities and a hollow deformable torsion member interconnecting the housings.

These state of the art energy absorption systems show several drawbacks with respect to the new criteria referred to above.

It is the object of the present invention to provide an absorption device which meets the following objectives:

1. To restrain the passenger's body in the required dynamic conditions by means of a shoulder harness, single or double, featuring one or two attachments at the top of the frame of the backrest, in association with a lap belt, as currently used in automotive or other applications (such as aircraft applications), comprising rotation means allowing the backrest to break over when loaded forward by the shoulder belts, when the said loads exert a momentum exceeding a predetermined static resistance momentum on a specific part of the device. This component is working directly against the pivot axis of the backrest and is allowed a rotational, energy absorbing stroke, with the same angular amplitude than the backrest breakover, under constant application of the predetermined momentum;

to extend this protection to scenarios of successive impacts including the full range of loading less than, and up to, the ultimate required in a variety of directions, while keeping the energy absorption capacity to smooth off the peak of the impact pulses at the predetermined and built-in value.

To allow the return (or rebound) of the occupant to his initial raised up position after each impact breakover.

2. To perform all functions in normal use by the passengers and crew, in particular the control of the backrest recline as provided for in conventional seats.

The backrest recline control device is characterised by its integration with the breakover control system, working on the same backrest axle, sharing the space available with the energy absorption system in the breakover mode. Functionally the two systems are independent and provisions are made to avoid any interference in the range of designed angular motions of the backrest, either in recline or in breakover.

3. To provide for easy selection of recline and break-over angular limitations, as required by the cabin layout, and current regulations. Specific means to select the range of angular motions are provided, for use by the maintenance crew.
4. To make use of conventional technology in the design & manufacturing.
5. To design for the lowest possible weight and production cost
6. To design for a minimum maintenance cost
7. To be compatible with a conventional seat configuration & its installation in a current, pressurised, transport category aircraft

SUMMARY OF THE INVENTION

The invention thus provides for a vehicle seat for equipment with shoulder belts connected to the seat backrest, comprising an energy absorbing device acting on the seat backrest, in which said energy absorbing device comprises deformable energy absorbing means (12), with at least one arcuate (13,14) area of plastically fragmentable material, opposing the rotation of said seat backrest (21) with respect to a lower seat structure (20) in one direction, corresponding to a forward-leaning movement of said seat backrest.

The concept of deformable energy absorbing means comprising arcuate areas of plastically fragmentable material is known per se in the prior art, in connection with energy absorption on safety belt retractor means and/or retention means. Reference is made in this respect to prior art documents U.S. Pat. No. 5,639,806 and EP 1 000 822.

According to a preferred embodiment of the invention, said deformable energy absorbing means preferably comprise
    at least one disc with at least one radially positioned arcuate area of plastically fragmentable material, and
    at least one stop plug acting upon said arcuate area of fragmentable material in said disc.

According to a more preferred embodiment of the invention, said disc(s) comprise at least two radially positioned arcuate areas of plastically fragmentable material, and at least two corresponding stop plugs;
    most preferably the energy absorbing means comprise two discs and (or) two to four radially positioned arcuate areas of plastically fragmentable material, each extending over an angle of, for instance, 0,4 to 3 radiant (approximately 24–180°), and two to four corresponding stop plugs. Depending on the specific application the arcuate areas of plastically fragmentable material may however extend over a smaller angle (as from 0,1 radiant or less), or over a larger angle.

The plastically fragmentable material of the arcuate fragmentation areas is preferably selected from aluminium, aluminium alloy 2024 T3, aluminium alloy AU4G1, or any other metal, synthetic or composite material having equivalent properties.

A very specific embodiment of the invention may involve an energy absorbing device comprising a first part connected to the lower seat structure, respectively to the lower portion of the seat backrest, rotably interconnected with a second part connected to the lower portion of the seat backrest, respectively to the lower seat structure, via said deformable energy absorbing means, whereas the axis of rotation of said rotably interconnected first part and second part is positioned substantially along or in the vicinity of the hip joint axis in the profile of an average occupant.

According to an interesting embodiment of the invention, releasable retention means may be provided between such first part (2) and such second part (4), allowing the rotation of said first part with respect to said second part means into the direction opposite to said one direction, corresponding to a backward-leaning direction of the seat backrest, without acting on said energy absorbing means, whereas the rotation of said first part with respect to said second part into said one direction is subjected to the reaction of said energy absorbing means.

According to a preferred feature of this embodiment of the invention, said first part and said second part respectively constitute
    a support means of the lower seat structure, and
    a shaft connected to the lower portion of the seat backrest (or vice versa), whereas said releasable retention means preferably comprise a ratchet wheel mechanism providing fixed connection of said shaft with respect to said deformable energy absorbing means in said first direction, while providing free rotation of said shaft with respect to said deformable energy absorbing means in said opposite direction.

Said shaft preferably comprises a grooved part interconnecting said shaft to a corresponding grooved aperture in said deformable energy absorbing means, said releasable retention means, said disc(s) with radially positioned arcuate area(s) of plastically fragmentable material and/or said ratchet wheel mechanism.

According to a further feature of the invention, a separate conventional backrest recline control may in addition be integrated into said energy absorbing device, whereas said disc(s) with one or more area(s) of plastically fragmentable material further comprise one or more corresponding radially positioned arcuate open areas, allowing rotation of the disc(s) from a referenced position, defined with the backrest in upright position, into a direction opposite to the arcuate area of plastically fragmentable material. The slot width of said arcuate open area should suitably be slightly larger than the diameter of the stop plug to allow free rotation in the backward-leaning direction, without acting on the energy absorbing means nor making use of the releasable retention means.

The seat preferably comprises one energy absorbing device at one side of the seat, whereas the seat backrest is interconnected, on the corresponding side of the seat, to said energy absorbing device via a grooved shaft, and, on the other side of the seat to the energy absorbing device of the adjacent seat or the seat structure, via a free rotating axle.

The type of vehicle seats to which the invention most suitably applies is the group comprising surface transport vehicle seats, public transport vehicle seats and air transport vehicle seats.

It has further been found that in the vehicle seat according to the invention, the axis of rotation of the backrest has preferably to be moved forward to avoid the bulk of the energy absorbing device protruding beyond the rear envelope of the seat. This position is different from the current position of the reclining axis on conventional seats which are mostly located in the vicinity of the backrest frame.

Resulting from this position of the backrest rotation axis, to make provision for passenger comfort in the lower back area, the support axle is preferably split in two parts on the left and right side of the backrest frame, thus avoiding to install an axle crossing the full width of the backrest. This configuration leads to concentrate the momentum of the backrest to one side of the frame engaged through the axle of the energy absorbing device, the other side being a free rotation axle with no momentum capacity. This design decision, resulting in one energy absorbing unit per backrest, has proved to be the most economical in weight and cost, as well as compatible with the curved shape of a pressurised aircraft cabin, forbidding installation of an energy absorbing device on outboard seats in most seating layouts.

One of the additional design objectives of the invention is to provide a backrest control device with a dual capability:

In normal use, to control the recline at the choice of the passenger,

In emergency use, to control the breakover by a preset energy absorbing device.

1. To save space and weight, the energy absorbing device according to the invention combines the two functions in one device as compact as possible, located under the armrest, working on the common axle in connection with the backrest frame.

This offset position of the axle a positive effect on the safety and comfort of the passenger.

Indeed, in this position, the axis of rotation of the backrest frame is closer to the natural body hip joint than in conventional seats. As a result, when reclining for comfort, or breaking-over for safety, the rotation of the upper torso matches closely the rotation of the backrest and avoids uncomfortable back friction in recline, while keeping the initial shoulder belt position in break-over conditions.

As a further bonus, for maintenance purpose, it appears that the offset position of the backrest axle offers an easy access when dismounting the backrest from the seat main frame. To that end the axle of the backrest, featuring longitudinal grooves to transfer all momentum controlling the backrest angle, may allow, by axial motion, an easy disassembling of the backrest from the main seat frame.

This feature is also partially used for allowing a full breakover when required by a stretcher installation.

As the arcuate area, expected to absorb energy of a single impact, corresponds to the angular rotation of the back-rest during application of the impact loads, and as this rotation is limited to an angle matching the available striking distance ahead of the occupant, it results that the angular capacity of the arcuate area is from three to four times the capacity needed to absorb a single impact.

The energy absorbing mechanism according to the invention can therefore be designed to use this redundant capacity to cope with successive impacts scenarios.

Introducing a ratchet wheel in between the backrest and the discs supporting the arcuate area, allows the rebound of the backrest while keeping the disc in the position reached by the previous impact.

Ipso facto, the return of the backrest to its initial upright position meets the requirement limiting the breakover, and/or permanent deformation, especially when the seat would be installed next to an emergency exit.

This capacity to return to initial position and be available for a second or a third impact, is a distinctive advantage of the device according to the invention over the inflatable lap belt or any type of energy absorbing devices working on the seat structure.

The axis of rotation of the seat backrest is therefore preferably positioned substantially along or in the vicinity of the hip joint axis in the profile of an average occupant (i.e. the men and woman 50% ile occupant, well known in the art).

The energy absorbing device described above has a triple function in the vehicle seats according to the invention:

absorption of the energy on the base structure of the seat;

control of the headpath excursion of the head and upper body of the occupant reduction of the deceleration applied to the upper body part of the passenger.

The invention also relates to an energy absorbing device, per se, designed to oppose the rotation of a first part with respect to a second part via deformable energy absorbing means with an arcuate area of plastically fragmentable material, wherein the energy absorbing device comprises releasable retention means subjecting every rotation of said first part with respect to said second part support means into said first direction to the reaction of said energy absorbing means, and allowing the rotation of said first part with respect to said second part into the direction opposite to said first direction, without acting on said energy absorbing means.

According to a preferred embodiment of the energy absorbing device according to the invention, said deformable energy absorbing means comprise at least one disc with at least one radially positioned arcuate area of plastically fragmentable material, and at least one stop plug acting upon said arcuate area of fragmentable material in said disc.

The disc(s) preferably comprise at least two radially positioned arcuate areas of plastically fragmentable material and at least two corresponding stop plugs; the energy absorbing means may for instance comprise two discs with each two to four radially positioned arcuate areas of plastically fragmentable material, each extending over an angle of 0,4 to 3 radiant, and two to four corresponding stop plugs. Depending on the specific application the arcuate areas of plastically fragmentable material may however extend over a smaller angle (as from 0,1 radiant or less), or over a larger angle.

The plastically fragmentable material is preferably selected from aluminium, aluminium alloy 2024 T3, aluminium alloy AU4G1, or any other metal, synthetic or composite material having equivalent properties.

According to another preferred feature of the energy absorbing device according to the invention, said first part and said second part constitute a support means and a shaft, whereas said releasable retention means comprise a ratchet wheel mechanism providing fixed connection of said shaft with respect to said deformable energy absorbing means in said first direction, while providing free rotation of said shaft with respect to said deformable energy absorbing means in said opposite direction.

According to still another preferred feature of the invention, said shaft comprises a grooved part interconnecting said shaft to a corresponding grooved aperture in said deformable energy absorbing means, said releasable retention means, said disc(s) with radially positioned arcuate area(s) of plastically fragmentable material and/or said ratchet wheel mechanism.

DETAILED DESCRIPTION OF THE INVENTION

Figure 1A:
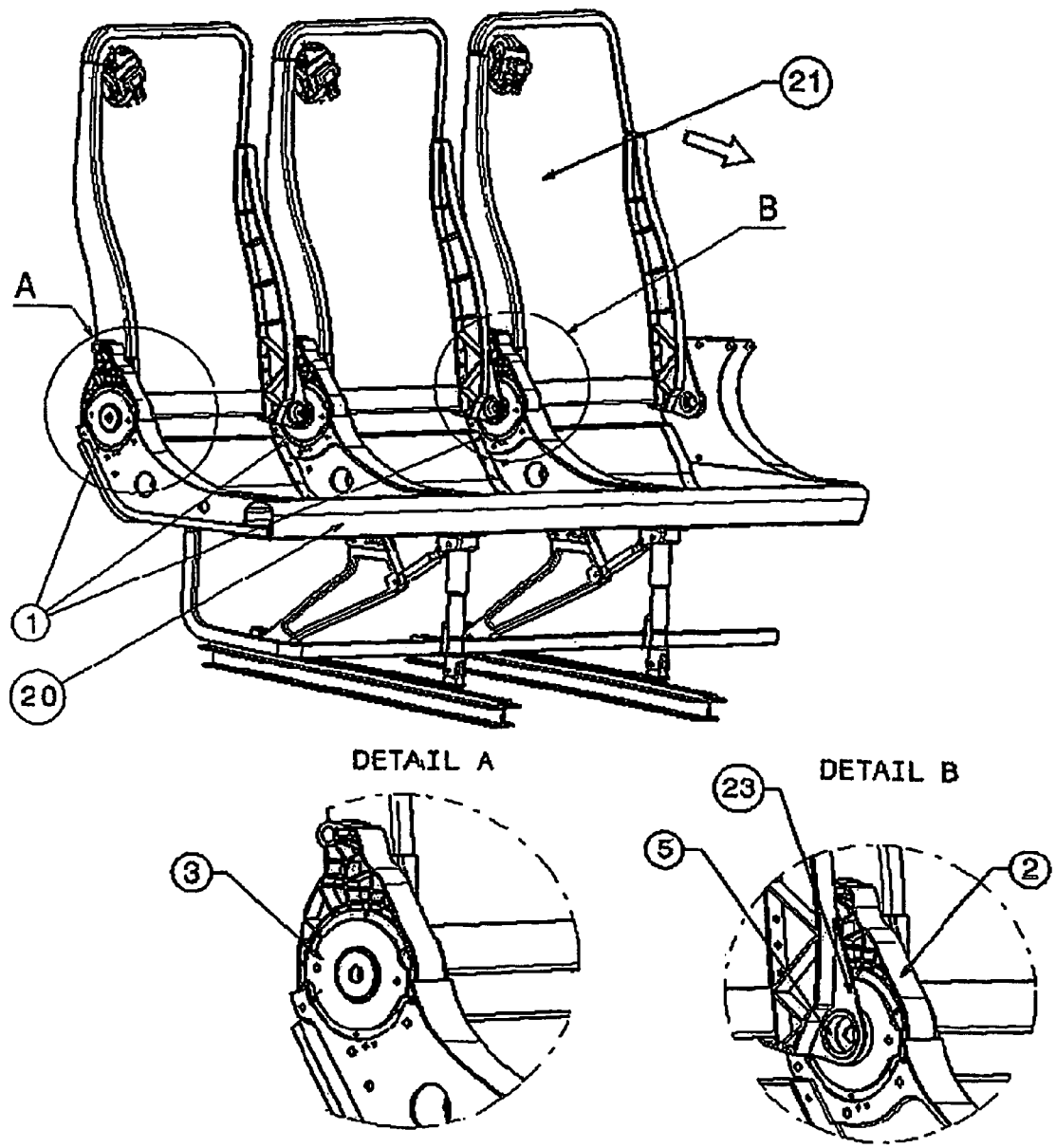
FIG. 1 A & 1 B : Isometric view of a typical assembly of a backrest and three point shoulder harness, mounted on a seat structure via a grooved shaft on one side and a free rotation axis on the opposite side. The grooved shaft is engaged in the energy absorbing device according to the invention.

The following is a detailed description of a preferred embodiment of the invention, as illustrated in the attached drawings.

It will ompbe appreciated by anyone skilled in the art that many modifications and variations of the invention are possible in the light of the above teaching and within the boundaries of the appending claims, without departing from the general scope and spirit of the invention.

The energy absorbing device according to this embodiment of the invention, for use on an aircraft passenger seat, involves:

A casing (the support means referred to above), in the general shape of a flat cylinder containing the working parts of the energy absorbing function, including essentially a grooved shaft extending transversely in the adjacent backrest frame to engage in the internally grooved section of the adjacent backrest bracket, to form a rigid connection in torsion between the backrest frame and the energy absorbing device. Each casing is also rigidly fixed to the seat bottom frame.

Inside the casing, the grooved shaft engages one disc (or wheel), featuring matching internal grooves, to the effect that the discs will be forced by the grooved shaft to follow all angular rotations, in recline or breakover of the backrest.

At the periphery of the discs (or wheels), an arcuate path is provided in a semi circular shape about the shaft axis. In this path, the material is reduced in thickness to leave a relatively thin web featuring a limited strength, dedicated to absorb energy by material fragmenting process, when forced against a static stop plug inserted at a specific point perpendicular and through the disc in the arcuate provided area.

The said static stop plug, mounted parallel to the shaft, is of such length as to extend through the casing at both ends after closure of the casing cover plates.

In this position the plug will oppose a firm stop to the rotation of the disc in the direction and under impulse of the backrest breakover.

In the opposite direction, corresponding to the backrest recline, the disc is free to rotate as the concerned area has been open to rotation by a curved arcuate slot whose width exceed the diameter of the static stop plug. The designed arc of the slot is such as to allow the maximum designed recline angle that the occupant of the seat might wish to adopt by use of a conventional control.

The breakover area features a restriction to the disc, and the associated backrest, in the breakover rotation. This restriction could be a reduced width, smaller than the diameter of the static stop plug, or a web of limited thickness, or a combination of both, tuned to provide by the resistance of the stop plug, a semi circular path opposed to the rotation of the backrest up to a predetermined value of the breakover momentum. When this value is exceeded by the impacts conditions the disc start to rotate and absorb energy by material fragmenting.

The energy absorbing system of this example in particular involves a plurality of discs mounted in parallel on a common shaft connected to one individual backrest.

They are similarly provided in the arcuate area, to propose each a free slot for backrest recline and a reduced thickness slot for energy absorption by material fragmenting process. The stop plug is installed the same way, through all discs and the casing static support, to perform the same stopping function.

The energy absorbing system of the example in particular also comprises two static plugs mounted in parallel with the shaft, positioned diametrically opposed in the arcuate area and sharing equally the available arcs dedicated for clearing the recline on one side and absorb the energy, on the other side, as required by the operational and or impact conditions.

The energy absorbing system according to this example furthermore comprises a ratchet wheel, installed between the shaft and each one of the discs, so that the torque applied by the breakover of the backrest is transmitted to the discs by a set of spring loaded ratchets.

In the energy absorbing system according to the example, the dimensions of the "forced slots" in the breakover area of the discs, are such that, after an impact, the discs will be retained by jamming on the static plugs in the position reached at the end of the impact pulse. In this situation, the ratchet wheels will enable the backrest to return to its initial upright position, and the system will be ready to perform the same function of energy absorption, starting from the new position of the discs.

In the energy absorption system according to the example, the total arc provided for energy absorption, has a capacity to absorb a succession of breakover impacts amounting, for example, to three impacts using each an average arc of 30°, up to a total of 90° arc.

The energy absorption system according to the example, comprises two discs, mounted in parallel on the common shaft, allowing installation of a recline control lever in between, in selective association with the common shaft, to allow control of the recline of the backrest by the occupant of the seat. The selective association is meant to control the recline only while leaving the possibility for backrest breakover without the angular limitations of a conventional recline system.

In the following description, any element identified by a number in one drawing will represent the same element in any other drawing. The following is a list of the major working elements:

Energy absorbing device assembly (1)
Casing (2)
Casing cover (3)

Grooved shaft (4)
Free rotation axle (5)
Disc (or discs) chamber (6)
Recline control sub-assy (7)
Recline lever (8)
Recline transmission wheel (9)
Breakover control sub-assy (10)
Disc sub-assy (11)
Disc frame & arcuate area (12)
Disc arcuate energy absorbing section (13)
Disc arcuate material area fragmented during impact (14)
Disc arcuate recline slot section (15)
Ratchet wheel (16)
Ratchets & axles (17)
Ratchet springs & axles (18)
Static stop plug (19)
Seat primary structure (20)
Backrest structure assembly (21)
Backrest controlled rotation bracket (22)
Backrest free rotation bracket (23)
Shoulder harness assembly (24)
Diagonal shoulder belt (25)
Casing opening for recline lever (26)
Lug (casing internal extension) (27)
Angular gaps in recline control assembly (28)
Grooved shaft lateral stop cover (29)

For the convenience of description, a forward direction and a rearward direction are defined by corresponding arrows relative to the perspective of a person sitting normally in passenger seat.

The device (1) is a mechanical rotative energy absorbing device, designed to dissipate part of the kinetic energy of the occupant of a passenger's seat, in a Transport Category Aircraft, when decelerated in a forward dynamic impact.

The device is fixed to the seat primary structure (20) and works in association with a backrest structure (21) on which a shoulder belt (25), is attached.

Figure 1:
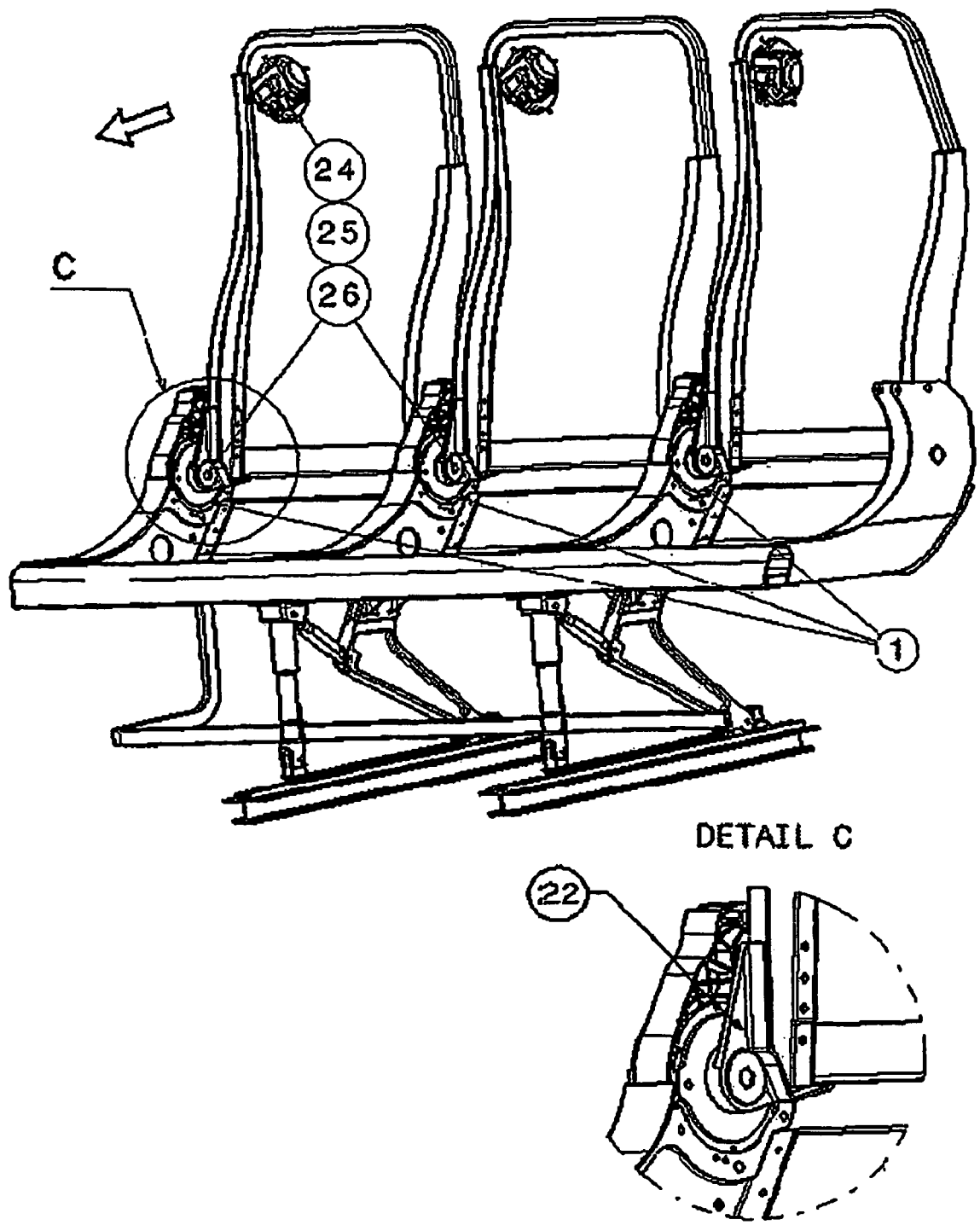

The shoulder belt (25) is associated with a lap belt (26) as parts of a three point shoulder harness assy (24) (ref. to FIG. 1).

The device controls the use, as a stopping distance, of the space available for breakover in front of the occupant, to the effect that the occupant head path in the direction of forward inertial load will be reduced and to avoid any lethal contact with any aircraft interior partition or seat in front, or any other interior feature.

The device is working, via the grooved shaft (4), through the structure of the backrest (21) and the shoulder belt (25), in opposition to any forward motion of the upper torso of the occupant, and will limit the loads applied to the mass of the upper torso within acceptable human body tolerance, considering the energy level involved, and will also limit the loads in the lower seat structure (20), including the tie-down to the aircraft floor and the aircraft floor itself, within allowable values.

Figure 2:
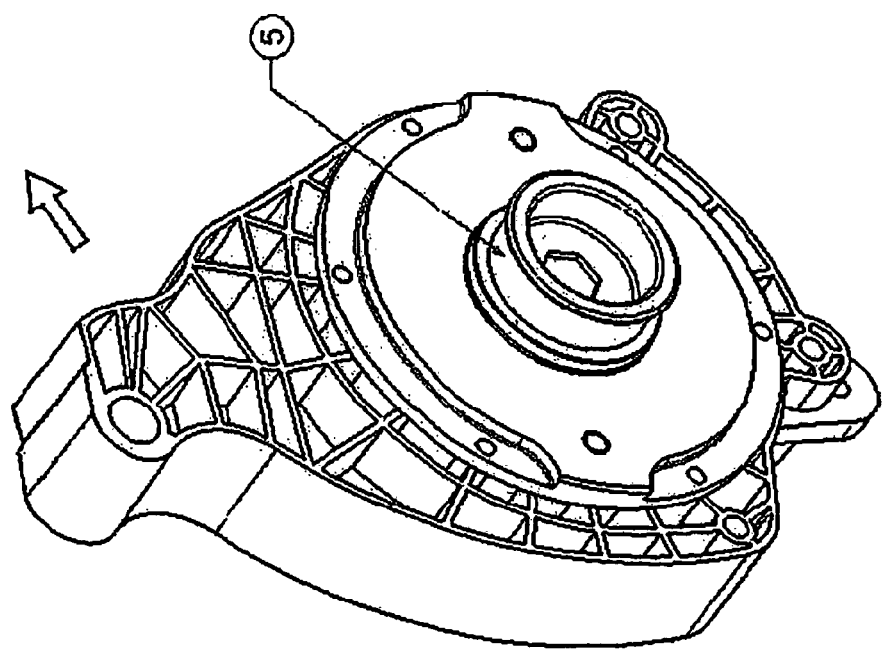
FIG. 2: Isometric view of the energy absorbing device according to the invention.
Figure 2:
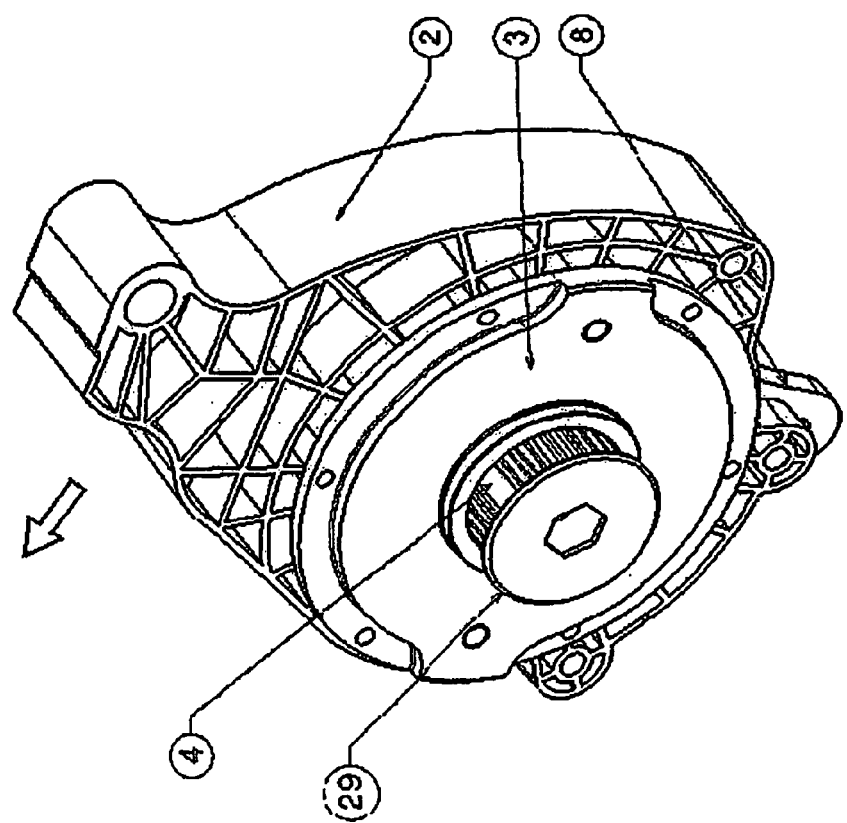

The backrest structure is also pivotally connected by a free rotation bracket (23) to the free rotation axle (5) on the side opposite to the device (ref. to FIG. 2).

The energy absorbing function is performed in a breakover control sub-assy (11) making use of a "fragmented material process" designed to produce an initial predetermined locking momentum on the grooved shaft (4) of the backrest bracket (22), therefore opposed to the backrest rotation up to a predetermined level, followed by a continuous braking momentum at a slightly superior level.

Figure 3:
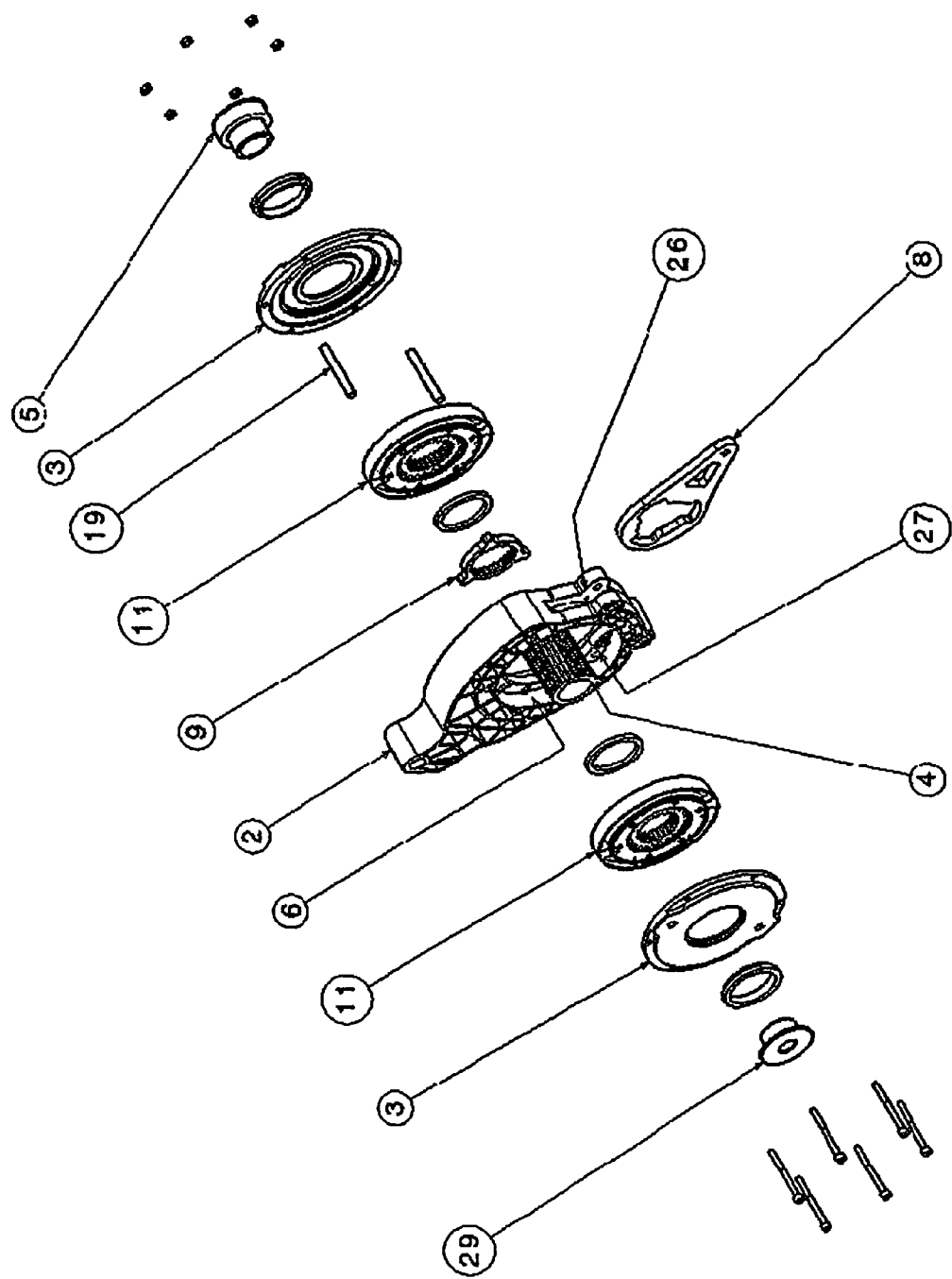
FIG. 3: Exploded view of the energy absorbing device according to the invention.

The energy absorbing device (ref. to FIG. 3) is characterised by a casing (2), in the general shape of a flat cylinder containing in the disc chamber (6) the working parts of the energy absorbing function, including essentially a grooved shaft (4) extending transversely in the adjacent backrest frame to engage in the internally grooved section of the adjacent backrest bracket (22), to form a rigid connection in torsion between the backrest frame (21) and the energy absorbing device (1). The grooved shaft (4) is fixed laterally to the grooved backrest bracket (22) by a stop cover (29).

The casing (2) is also rigidly fixed to the seat primary structure (20).

Inside the casing, the grooved shaft (4) engages, via a ratchet wheel system (16) featuring internal grooves and associated set of minimum three ratchets spring loaded (18) pivotally connected to the disc frames (12) in one or several discs sub-assy (11), to the effect that the discs sub-assy (11) will be forced by the grooved shaft to follow all rotations of the backrest in recline or breakover, with the exception of the rebound post-impact.

Figure 5:
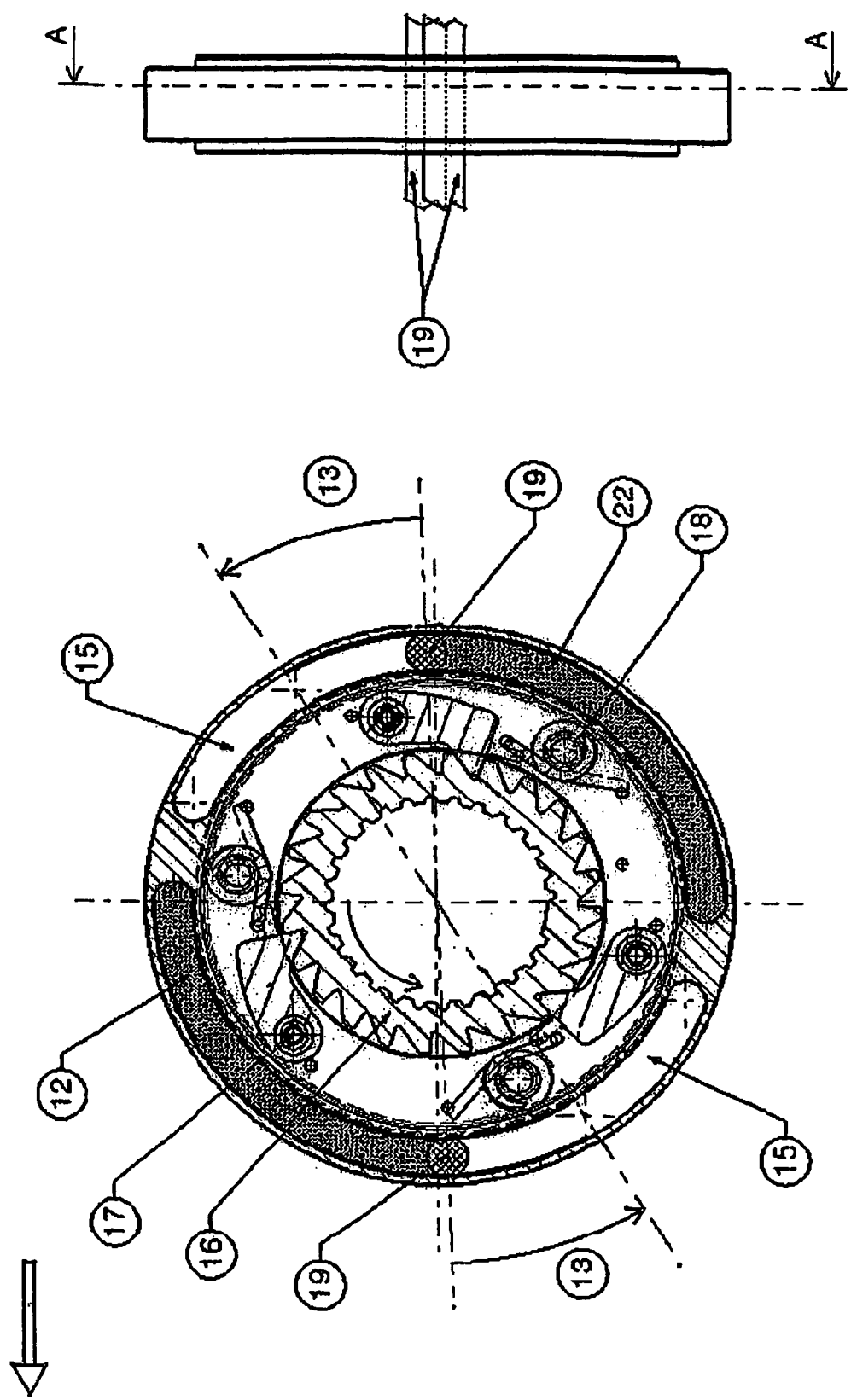
FIG. 5: Side view of a disc showing the configuration during the forward impact, when the disc rotate and the material of the arcuate area is fragmented by the static stop plug

At the periphery of the discs sub-assy (11), an arcuate area (12) is provided in a semi circular ring about the shaft axis. This area is divided in two sections: One section (13) is in charge of the energy absorbing function. In this section, the material is reduced in thickness to leave a relatively thin web featuring a limited strength, designed to absorb energy by material fragmenting process, when forced against a static stop plug (19) inserted at a specific point perpendicular and through the disc in the arcuate provided area (12) (ref. to FIG. 5).

In the preferred embodiment, for a better balance of the momentum loads, two static stop plugs (19) are mounted in parallel to the shaft (4), diametrically opposed, through the arcuate area and sharing equally the available arcs dedicated for clearing the recline on one way and absorb the energy, on the other way, as required by the operational and or impact conditions.

The said static stop plugs (19), mounted parallel to the shaft, are of such length as to extend through the casing, through any lug (27) or casing internal extension provided in between the discs and at both ends in the casing cover plates (3).

In this position the plugs will oppose a firm stop to the rotation of the disc sub-assy (11) in the direction and under impulse of the backrest breakover and will transfer any breakover momentum to the casing (2) and to the seat primary structure (20).

The arcuate area (13) opposes a restriction to the disc, and the associated backrest, to the breakover rotation. This restriction could result from a reduced width, smaller than the diameter of the static stop plug (19), or a web of limited thickness, or a combination of both, tuned to provide against the resistance of the stop plug, a semi circular path opposed to the rotation of the backrest up to a predetermined value of the breakover momentum. When this value is exceeded by the impacts conditions the disc start to rotate and absorb energy by material fragmenting.

Figure 4:
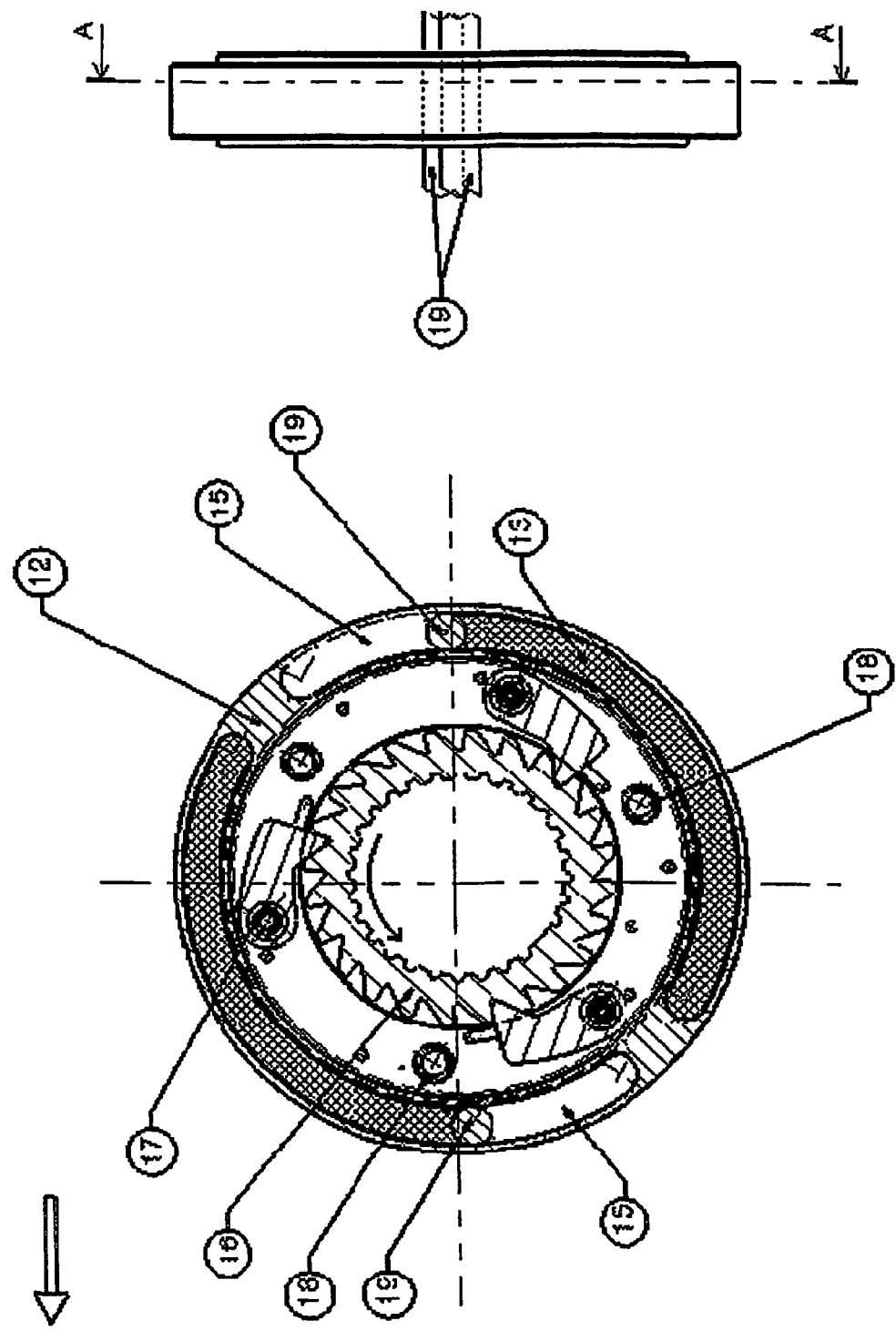
FIG. 4: Side view of a disc assembly containing a disc, a ratchet wheel, 3 ratchets, ratchet axles and springs; the arcuate area divided in the energy absorbing semi circular path and the free recline slot, separated by the static stop plug

A ratchet wheel (16) is installed between the shaft and each one of the discs, so that the torque applied by the breakover of the backrest is transmitted to the discs by a set of spring loaded ratchets (17) (ref. to FIG. 4). This one-way momentum transmission allows the return of the backrest close to its initial pre-impact position, to meet the requirements regarding the allowable post-impact seat structure deformation.

The device is also designed to perform its energy absorbing function in response to successive impacts, as might be expected in a survivable emergency landing scenario, by allowing, after each impact, the return of the occupant to his initial upright position and offering adequate capacity for further energy absorbing strokes.

Indeed the arcuate area (13), expected to absorb energy of a single impact, corresponds to the angular rotation, or breakover, of the backrest during application of a single impact load, and as this rotation is, by the seat installation criteria in an aircraft, limited to an angle matching the available stopping distance in front of the occupant (about 25°), it may be observed that the angular capacity of the arcuate area being 120° is from three to four times the capacity needed to absorb a single impact at the highest designed level (16G forward).

This being a direct advantage resulting from the internal geometry of the device, that is, the compact semi circular shape of the arcuate area (13), the device mechanism is designed with the means to use this redundant capacity to cope with successive impacts scenarios.

Figure 6:
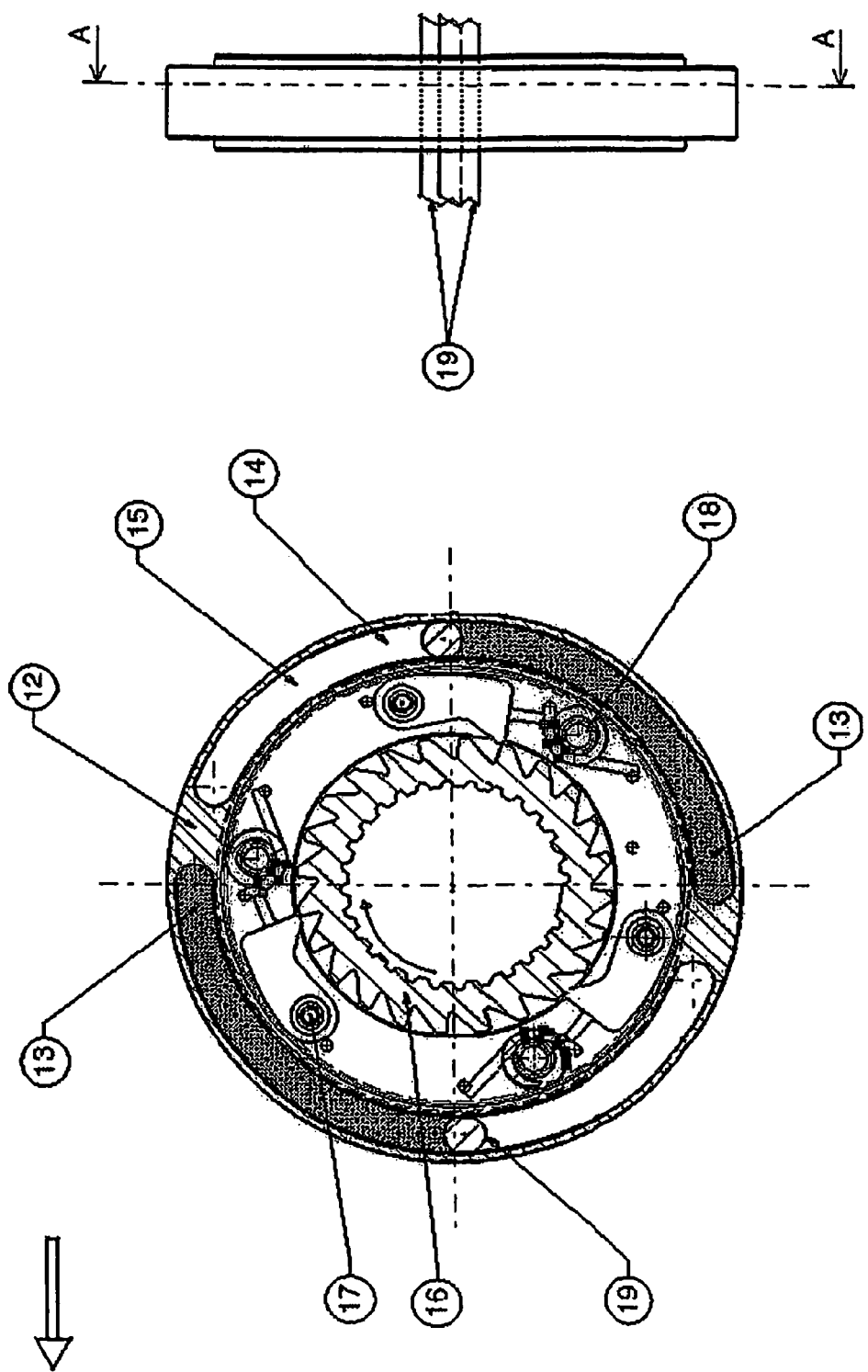
FIG. 6: Isometric view describing the configuration of the discs components during the rebound phase after the forward initial impact

By making use of the ratchet wheels (16) (provided in between the shaft (4) of the backrest and the discs sub-assy (11) supporting the arcuate area (12) to allow the rebound of the backrest), it is provided in the detail design of the arcuate area (13) the possibility to keep the discs sub-assy (11) in the position reached under the previous impact (ref. to FIG. 6).

To that end, the dimensions of the forced slots in the breakover area of the discs (14), are such that, after an impact, the discs will be retained by jamming on the static plugs in the position reached at the end of the impact pulse. In this situation, the ratchet wheels will enable the backrest to return to its initial upright position, and the system will be ready to perform the same function of energy absorption, starting from the new position of the discs.

This capacity to return to initial position and be available for a second or a third impact, is a distinctive advantage of the device over the inflatable lap belt or any type of energy absorbing devices working on the seat structure Besides, designing the arcuate energy absorption section to limit the stroke to about 25° under a 16 g impact is a challenging design objective in consideration of the occupant tolerance and the seat structural limitations. The experience has shown that the margin of success on this criteria is very narrow but not out of reach to those familiar with the art to which this invention relates.

There is also a dual capability of the backrest control device. Due to the particular configuration of the backrest pivot point, it was soon determined that one of the design objective of the invention should be to provide a backrest control device with a dual capability:

in normal flight conditions, to control the recline at the choice of the passenger;

in emergency conditions, to control the breakover by a pre-set energy absorbing device;

To save space and weight, it was decided to combine the two functions in one assembly (1), as compact as possible, located under the armrest, working on the common shaft in connection with the backrest frame.

The assembly (1) integrates the means to allow the occupant of the seat to control the recline of his backrest.

The backrest linear recline control device (19) is characterised by its integration with the breakover control system, working on the same backrest shaft (4) sharing the space available in the disc chamber (6) with the energy absorption system Functionally the two systems are independent and provisions are made to avoid any interference in the range of designed angular motions of the backrest, either in recline or in breakover.

They are similarly provided in the arcuate area (22), to propose each a free arcuate recline slot section (15) for backrest recline opposite to the energy absorbing section (13). The stop plugs (19) are installed the same way, through all discs and the casing static support, to perform the same stopping function in the upright position of the backrest.

Figure 7:
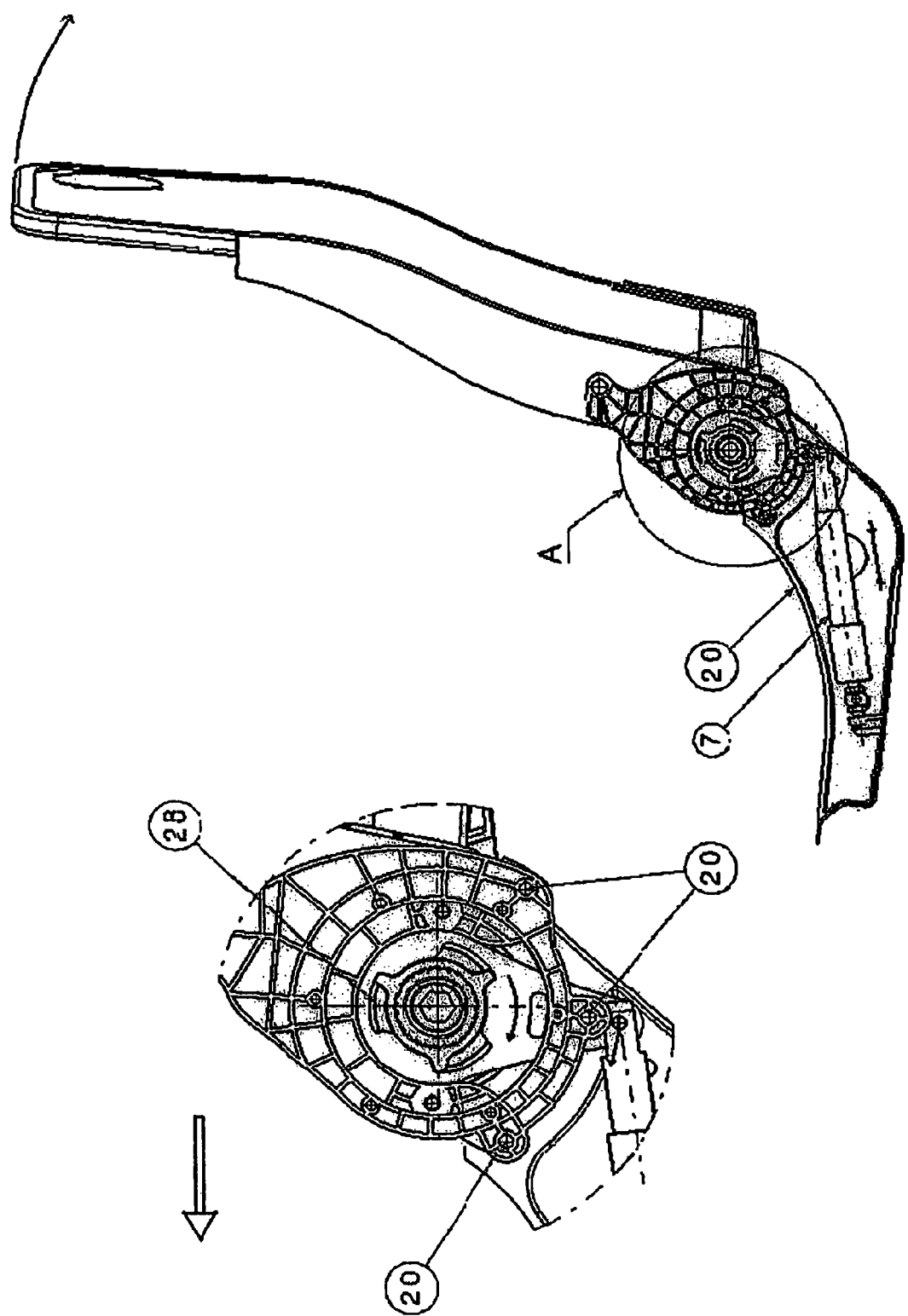
FIG. 7: Isometric view showing the configuration of the recline control sub-assembly during the backrest recline function

The two discs are mounted in parallel on the common shaft (4), allowing installation of a recline control lever (8) in between, in selective association with the common shaft, to allow control of the recline of the backrest by the occupant of the seat. The selective association is meant to control the recline only while leaving the possibility for backrest breakover without the angular limitations of a conventional recline system. This is achieved by installation of a selective transmission wheel (9) in between the shaft and the recline lever (8). Angular gaps (28) are provided between the wheel (9) and the lever (8), allowing the necessary breakover as required by the energy absorbing function without interference (ref. to FIG. 7).

For the same purpose, In the opposite direction, corresponding to the backrest recline, the discs sub-assy (11) are free to rotate as the concerned area has been opened to rotation by the arcuate recline slot (15) whose width exceed the diameter of the static stop plug (19). The designed arc of the slot is such as to allow the maximum designed recline angle that the occupant of the seat might wish to adopt by use of a conventional linear control.

While specific embodiments and applications of this invention have been shown and described, it should be clear to those skilled in the art that many more modifications and applications are possible without departing from the inventive concepts herein.

Thus, whereas the invention has been illustrated specifically referring to aircraft seats, it must be stressed that the invention is also particularly suited for any type of surface or air transport vehicle, and in particular for any type of public transport vehicle.

The invention is, therefore, not to be restricted in any way, except in the spirit of the appended claims.

The invention claimed is:

1. Vehicle seat for equipment with shoulder belts connected to a seat backrest (21) wherein an energy absorbing device (1), acting on the seat backrest, comprises deformable energy absorbing means (12), with at least one arcuate area (13, 14) of plastically fragmentable material, opposing the rotation of said seat backrest (21) with respect to a lower seat structure (20), in one direction, corresponding to a forward-leaning movement of said seat backrest, a first part (2), connected to the lower seat structure (21), respectively to the lower portion of the seat backrest (20), being rotably interconnected, via said deformable energy absorbing means (12), with a second part (4), connected to the lower portion of the seat backrest (20), respectively to the lower seat structure (21), whereas releasable retention means (16) are provided between said first part (2) and said second part (4), allowing the rotation of said first part with respect to said second part into the direction opposite to said one direction, corresponding to a backward-leaning direction of the seat backrest, without acting on said energy absorbing means, whereas the rotation of said first part with respect to said second part into said one direction is subjected to the reaction of said energy absorbing means.

2. Vehicle seat according to claim 1, wherein said first part (2) and said second part (4) respectively constitute a support means (2) of the lower seat structure and a shaft (4) connected to the lower portion of the seat backrest, or vice versa, whereas said releasable retention means comprise a ratchet wheel mechanism providing fixed connection of said shaft with respect to said deformable energy absorbing means in said first direction, while providing free rotation of said shaft with respect to said deformable energy absorbing means in said opposite direction.

3. Vehicle seat according to claim 2, wherein said deformable energy absorbing means comprise at least one disc with at least one radially positioned arcuate area of plastically fragmentable material, and at least one stop plug acting upon said arcuate area of fragmentable material in said disc.

4. Vehicle seat according to claim 2, wherein said deformable energy absorbing means comprise at least one disc with at least two radially positioned arcuate areas of plastically fragmentable material, and at least two corresponding stop plugs acting upon said arcuate area of fragmentable material in said disc.

5. Vehicle seat according to claim 2, wherein the axis of rotation of said rotably interconnected first part (2) and second part (4) is positioned substantially along or in the vicinity of the hip joint axis in the profile of an average occupant.

6. Vehicle seat according to claim 2, wherein a backrest recline control is integrated into said energy absorbing device, whereas said disc(s) with one or more area(s) of plastically fragmentable material further comprise one or more corresponding radially positioned arcuate open areas, allowing rotation of the disc(s) from a referenced position, defined with the backrest in upright position, into a direction opposite to the arcuate area of plastically fragmentable material.

7. Vehicle seat according to claim 2, wherein the seat comprises one energy absorbing device at one side of the seat, whereas the seat backrest is interconnected, on the corresponding side of the seat, to said energy absorbing device via a grooved shaft, and, on the other side of the seat to the energy absorbing device of the adjacent seat or the seat structure, via a free rotating axle.

8. Vehicle seat according to claim 2, wherein said vehicle is a public transport vehicle.

9. Aircraft seat for equipment with shoulder belts connected to a seat backrest (21) wherein an energy absorbing device (1), acting on the seat backrest, comprises deformable energy absorbing means (12), with at least one arcuate area (13, 14) of plastically fragmentable material, opposing the rotation of said seat backrest (21) with respect to a lower seat structure (20), in one direction, corresponding to a forward-leaning movement of said seat backrest, a first part (2), connected to the lower seat structure (21), respectively to the lower portion of the seat backrest (20), being rotably interconnected, via said deformable energy absorbing means (12), with a second part (4), connected to the lower portion of the seat backrest (20), respectively to the lower seat structure (21), whereas releasable retention means (16) are provided between said first part (2) and said second part (4), allowing the rotation of said first part with respect to said second part into the direction opposite to said one direction, corresponding to a backward-leaning direction of the seat backrest, without acting on said energy absorbing means, whereas the rotation of said first part with respect to said second part into said one direction is subjected to the reaction of said energy absorbing means.

10. Aircraft seat according to claim 9, wherein said first part (2) and said second part (4) respectively constitute a support means (2) of the lower seat structure and a shaft (4) connected to the lower portion of the seat backrest, or vice versa, whereas said releasable retention means comprise a ratchet wheel mechanism providing fixed connection of said shaft with respect to said deformable energy absorbing means in said first direction, while providing free rotation of said shaft with respect to said deformable energy absorbing means in said opposite direction.

11. Aircraft seat according to claim 10, wherein said deformable energy absorbing means comprise at least one disc with at least one radially positioned arcuate area of plastically fragmentable material, and at least one stop plug acting upon said arcuate area of fragmentable material in said disc.

12. Aircraft seat according to claim 10, wherein said deformable energy absorbing means comprise at least one disc with at least two radially positioned arcuate areas of plastically fragmentable material, and at least two corresponding stop plugs acting upon said arcuate area of fragmentable material in said disc.

13. Aircraft seat according to claim 10, wherein the axis of rotation of said rotably interconnected first part (2) and second part (4) is positioned substantially along or in the vicinity of the hip joint axis in the profile of an average occupant.

14. Aircraft seat according to claim 10, wherein a backrest recline control is integrated into said energy absorbing device, whereas said disc(s) with one or more area(s) of plastically fragmentable material further comprise one or more corresponding radially positioned arcuate open areas, allowing rotation of the disc(s) from a referenced position, defined with the backrest in upright position, into a direction opposite to the arcuate area of plastically fragmentable material.

15. Aircraft seat according to claim 10, wherein the seat comprises one energy absorbing device at one side of the seat, whereas the seat backrest is interconnected, on the corresponding side of the seat, to said energy absorbing device via a grooved shaft, and, on the other side of the seat to the energy absorbing device of the adjacent seat or the seat structure, via a free rotating axle.

* * * * *